United States Patent [19]
Torrens et al.

[11] Patent Number: 5,335,887
[45] Date of Patent: Aug. 9, 1994

[54] PIPE SUPPORT BRIDGE

[76] Inventors: Beverly Torrens; Paul Miron, both of Box 607, Armstrong B.C., Canada, V0E 1B0

[21] Appl. No.: 813,000

[22] Filed: Dec. 24, 1991

Related U.S. Application Data

[63] Continuation-in-part of Ser. No. 668,381, Mar. 21, 1991, Pat. No. 5,163,642, which is a continuation of Ser. No. 263,535, Oct. 27, 1988, abandoned.

[51] Int. Cl.⁵ .................................................. F16L 3/00
[52] U.S. Cl. ........................................... 248/49; 248/124
[58] Field of Search ............ 248/49, 55, 124, 149, 248/676, 670, 671; 138/106, 105; 403/254, 409.1, 49, 246

[56] References Cited

U.S. PATENT DOCUMENTS

| | | | |
|---|---|---|---|
| 735,618 | 8/1903 | Tannewitz | 403/409.1 X |
| 1,225,981 | 5/1917 | Loughridge | 182/181 X |
| 1,818,961 | 8/1931 | Kramer | 248/49 |
| 2,405,819 | 8/1946 | Dustman | 248/49 |
| 2,709,384 | 5/1955 | Harris . | |
| 2,808,873 | 10/1957 | Snapp, Jr. | 248/49 |
| 2,989,142 | 6/1961 | Gill | 248/165 X |
| 3,303,937 | 2/1967 | McConnell | 211/187 X |
| 3,494,849 | 2/1970 | Hess | 248/49 X |
| 3,568,455 | 3/1971 | McLaughlin et al. | 248/49 X |
| 3,648,468 | 3/1972 | Bowers | 248/49 X |
| 3,687,406 | 8/1972 | Krahe et al. | 248/55 |
| 3,735,973 | 5/1973 | Petrie | 248/55 X |
| 3,767,149 | 10/1973 | Hill | 248/49 |
| 3,963,205 | 6/1976 | Hageman | 248/55 |
| 4,128,219 | 12/1978 | Kaigler, Jr. | 248/49 X |
| 4,139,142 | 2/1979 | Maple et al. | 248/55 X |
| 4,709,886 | 12/1987 | Smart et al. | 248/49 |
| 5,028,019 | 7/1991 | Hardtke | 248/49 X |
| 5,072,901 | 12/1991 | Scott | 248/49 |
| 5,102,073 | 4/1992 | Lestenkof, Jr. | 248/49 |

FOREIGN PATENT DOCUMENTS

| | | | |
|---|---|---|---|
| 414789 | 12/1966 | Switzerland | 248/55 |
| 1417543 | 12/1975 | United Kingdom | 248/49 |

*Primary Examiner*—Karen J. Chotkowski

[57] ABSTRACT

A pipe support bridge comprising a pair of upstanding support brackets and a central truss member having top and bottom edges and side edges. The top edges are shorter than the bottom edges. Each support bracket has a central vertically aligned channel member to slidably receive the side edges of the central channel member such that the central truss members is supported between the support brackets. The assembled pipe support bridge is wider at the bottom then the top. The angle of the truss allows the support brackets to rest at various angles to the truss providing various degrees of side thrust support. The locking system comprising pins extending from the sides of the truss member and alignable with holes in the support brackets allows the central truss to be adjusted to different heights in the support brackets. Locating members are fixed to the central truss member for positioning a pipe to be supported atop the pipe support bridge.

11 Claims, 9 Drawing Sheets

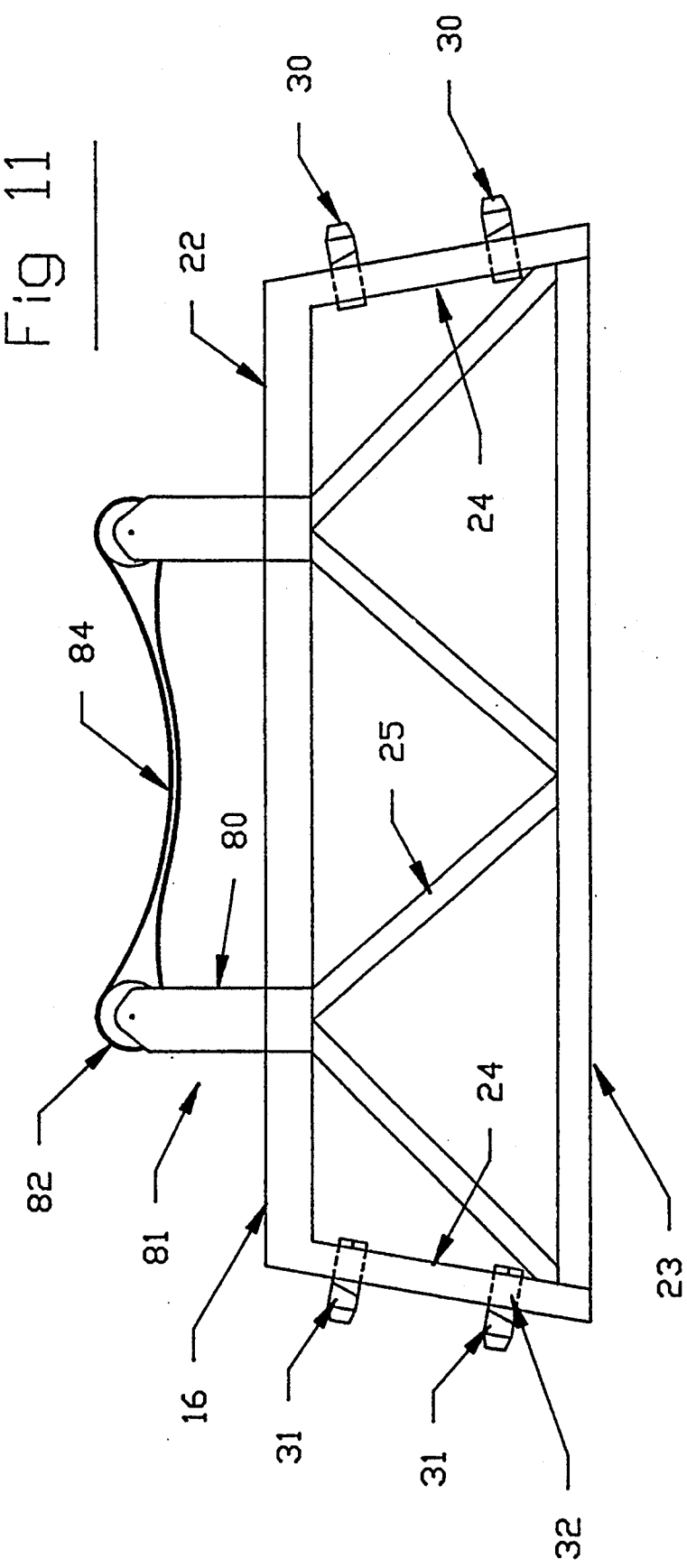

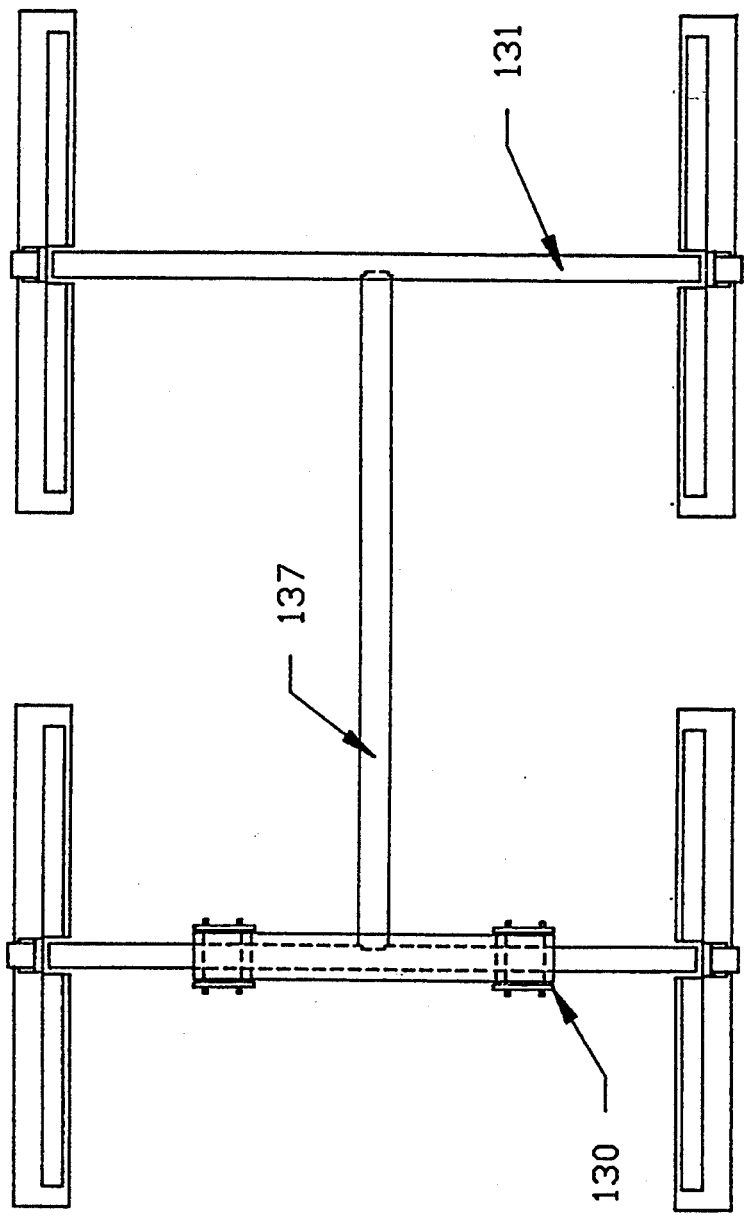

PIPE SUPPORT BRIDGE

CROSS REFERENCE TO RELATED APPLICATIONS

This is a continuation-in-part of application Ser. No. 07/668,381 filed Mar. 21, 1991 and now U.S. Pat. No. 5,163,642 which is a continuation of application Ser. No. 07/263,535 filed Oct. 27, 1988 and now abandoned.

The invention relates to a pipe support bridge for supporting pipes during construction, several claims for which have already been allowed under the above noted applicant and serial number.

In the construction of pipelines to transport water or other fluids or material, the preferred method often involves burying the pipeline to protect the pipe. Burying the pipeline avoids exposing the pipe to the elements and allows for normal use of the land above the buried line.

Underground pipelines are generally built by digging the necessary trenches to accept the pipeline, assembling sections of the pipeline above ground and then lifting the assembled sections by crane or other suitable means into the prepared trenches. At present, the pipeline sections are often assembled and worked on directly on the ground beside the trench. Obviously, such an arrangement does not provide ideal working conditions and over varied terrain this can lead to major problems with aligning the pipe sections to be assembled. In order to perform the job of putting together pipe sections more efficiently, it is desirable to have temporary pipe supports on which sections of the pipe can be built prior to burying in the ground. Such temporary pipe supports must be capable of securely supporting the weight of a pipeline section as it is constructed. The pipe supports must be placed at intervals along the length of the pipe section under construction such that the pipe is fully supported and does not sag leading to cracks and possible leaks. Additionally, it would be advantageous to have a pipe support stand that is of simple and rugged construction and easily portable so that supports can be moved along the trenches as sections of pipeline are completed and buried in place. A further desirable feature of a temporary pipe support is that it be adjustable to accommodate variations in the terrain beside the trenches. Pipelines once joined together and awaiting ditching undergo tremendous side thrust torque. It is desirable that a temporary pipe support bridge be constructed to counteract side thrust torque and hold the joined pipe fixed in the transverse position until ditched.

Prior art devices for holding and supporting pipes are known. All those known to the applicant have been disclosed in the prosecution of the aforementioned previous application. They include small scale work benches for supporting relatively short lengths of small diameter pipe suitable for indoor plumbing and the like or include permanent pipe supporting means. None of the prior art shows an easily adjustable temporary support bridge that is specifically designed for supporting pipelines under construction that is able to handle a range of pipe sizes up to the larger diameter pipes that are often used in pipeline construction.

Therefore, there exists a need for a support bridge that can be used when constructing pipelines and that has the desirable features previously mentioned. Accordingly, the apparatus of the present application provides a pipe support which is easy to transport, and adjustable to different heights to accommodate variations in terrain allow for side thrust torque and will support a joined pipe line fixed in the transverse position. The present invention is a pipe support bridge comprising:

a pair of upstanding support brackets, each support bracket having a vertically aligned central channel member;

a central truss member having top and bottom edges and side edges, each side edge being slidably received in the central channel member of one of said support brackets such that said central truss members is supported between said support brackets;

a central truss member having top and bottom edges and side edges, where the top edge is shorter that the bottom edge and the joining of the side edges creates an angle that when each side edge is slidably received in the central channel member of one of said support brackets such that said central truss member is supported between said support brackets a support bridge is assembled adjustably angled to the ground.

locking means to locate said central truss at different heights in said channel members of said support brackets;

pipe locating means fixed to said central truss member for positioning a pipe to be supported atop said pipe support bridge.

Figure 6A:
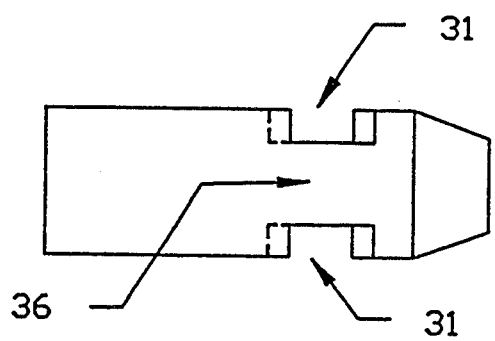
Figure 6B:
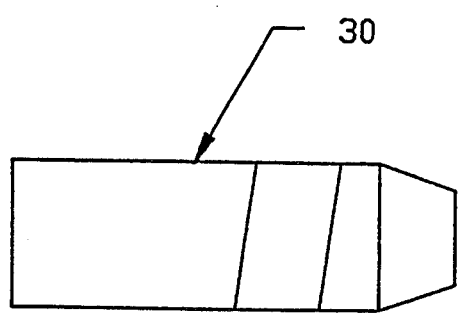
Figure 6C:
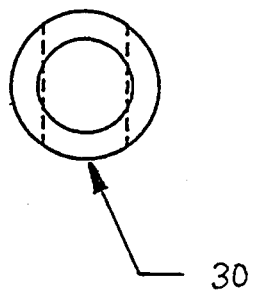
Figure 7:
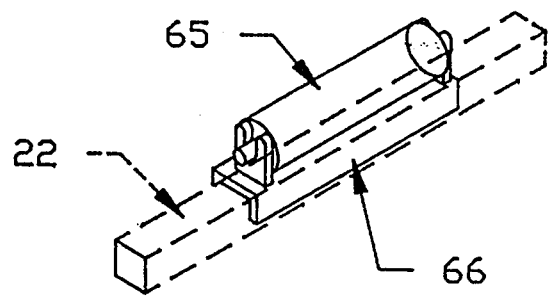

FIGS. 6A-6C show detailed views of pin 30 with a pair of slots 31 on opposite sides of the pin 30 to define a neck in the pin 36;

FIG. 7 shows a pipe roller attachment for use with the pipe support bridge.

Figure 8:
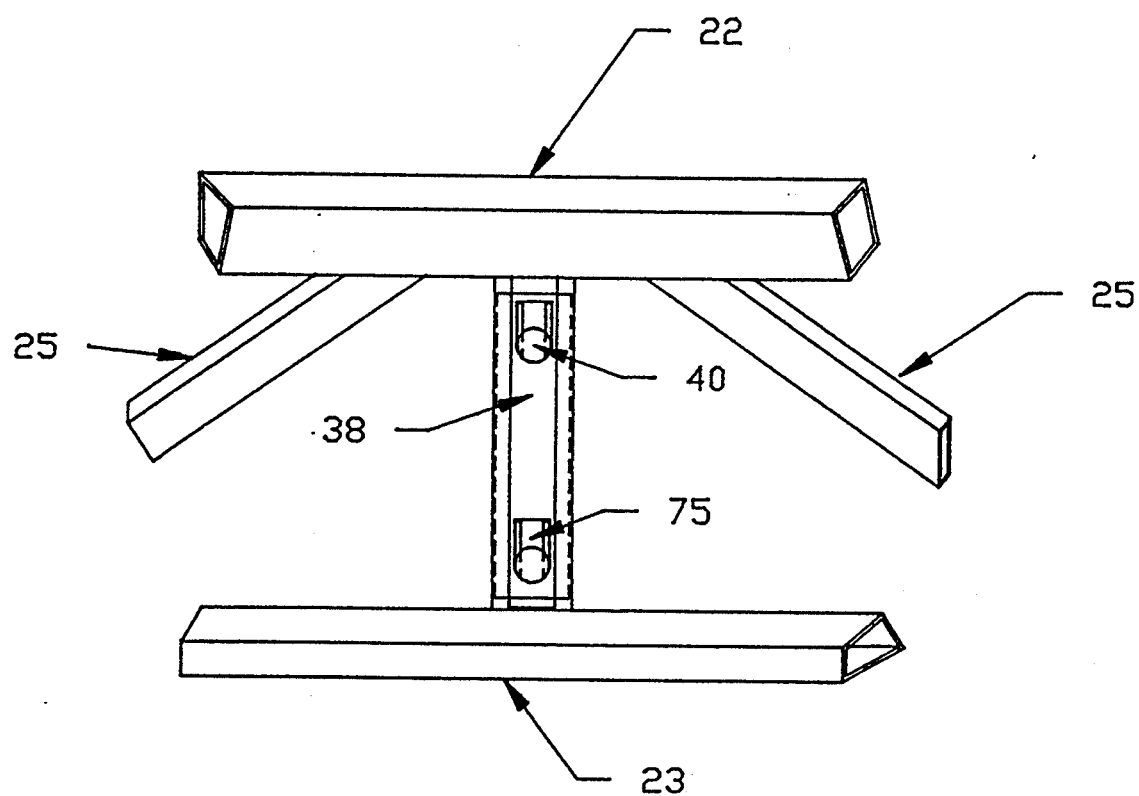

FIG. 8 is a detailed view of the interconnecting means centrally located within the bracing system of a truss for the purposes of interconnecting pipe support units for strength and stability as shown in FIG. 12.

Figure 9:
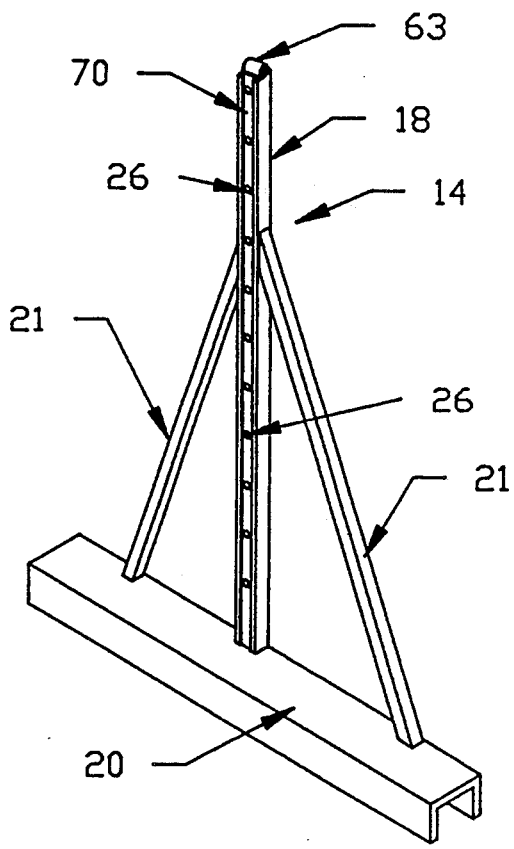

FIG. 9 shows the support bracket.

Figure 10:
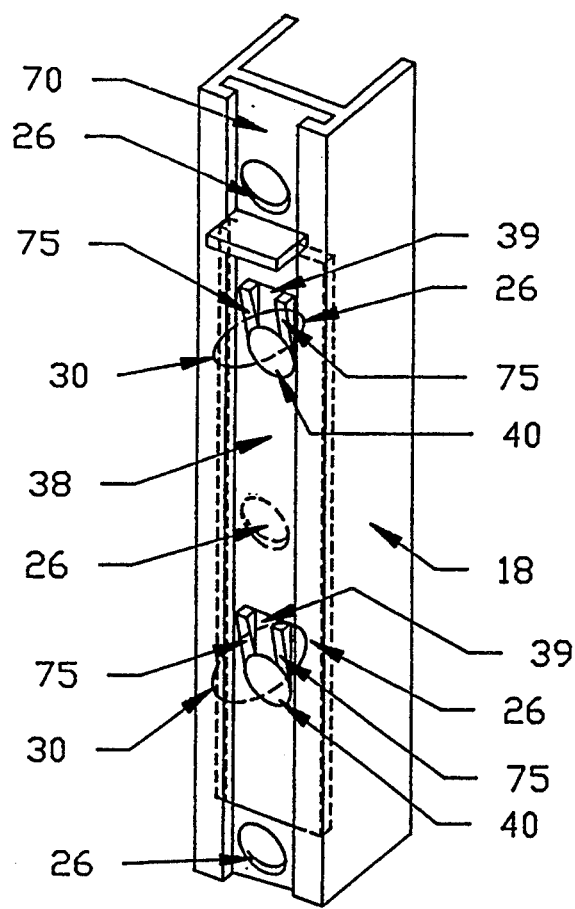

FIG. 10 is a detailed view of a locking plate.

FIG. 11 is a view of a central truss member.

FIG. 12 is a plan view showing how the support bridges can be interconnected.

Figure 1:
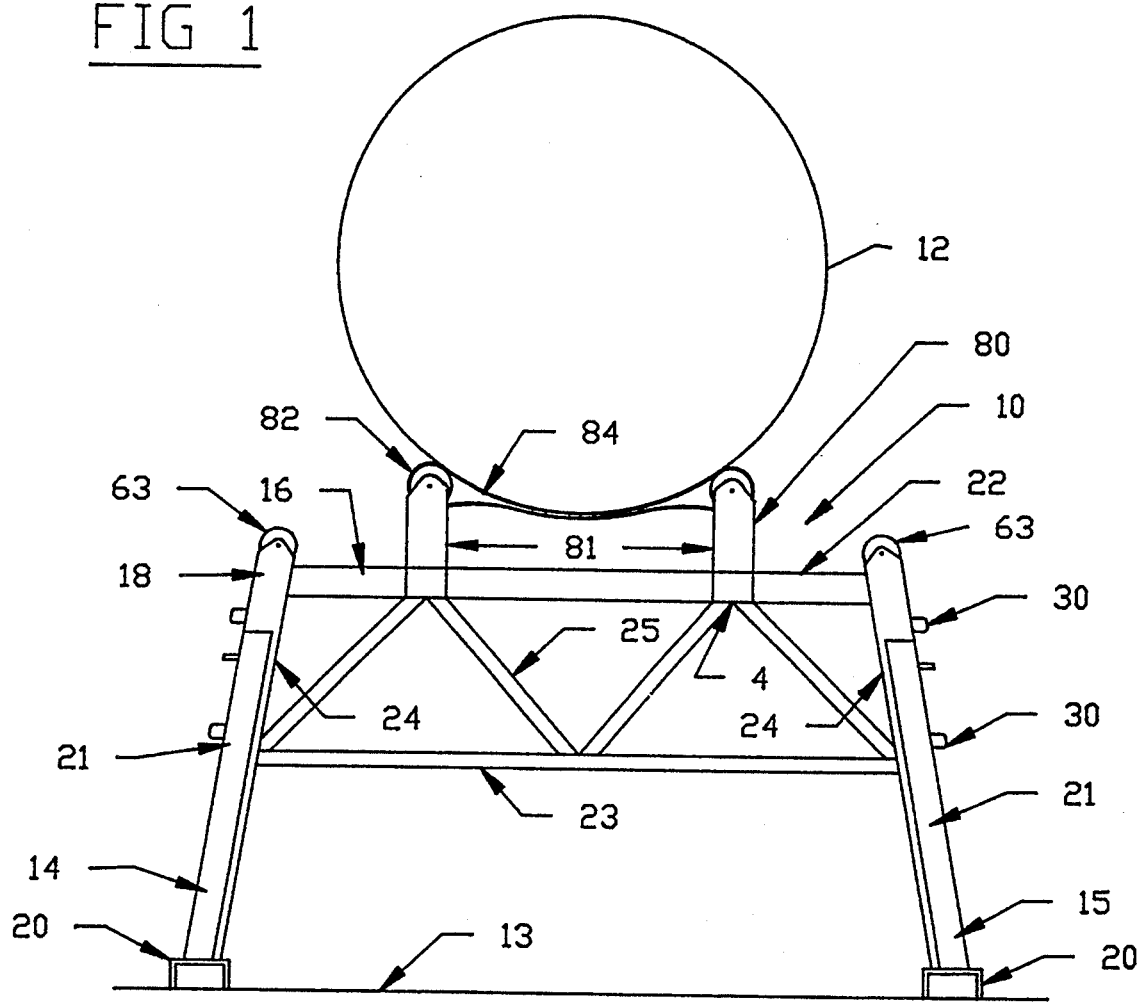
FIG. 1 is a front plan view of a pipe support bridge built according to the present invention.

Referring to FIG. 1, there is shown a pipe support bridge 10 according to the present invention supporting a pipe 12 above surface 13.

Figure 3:
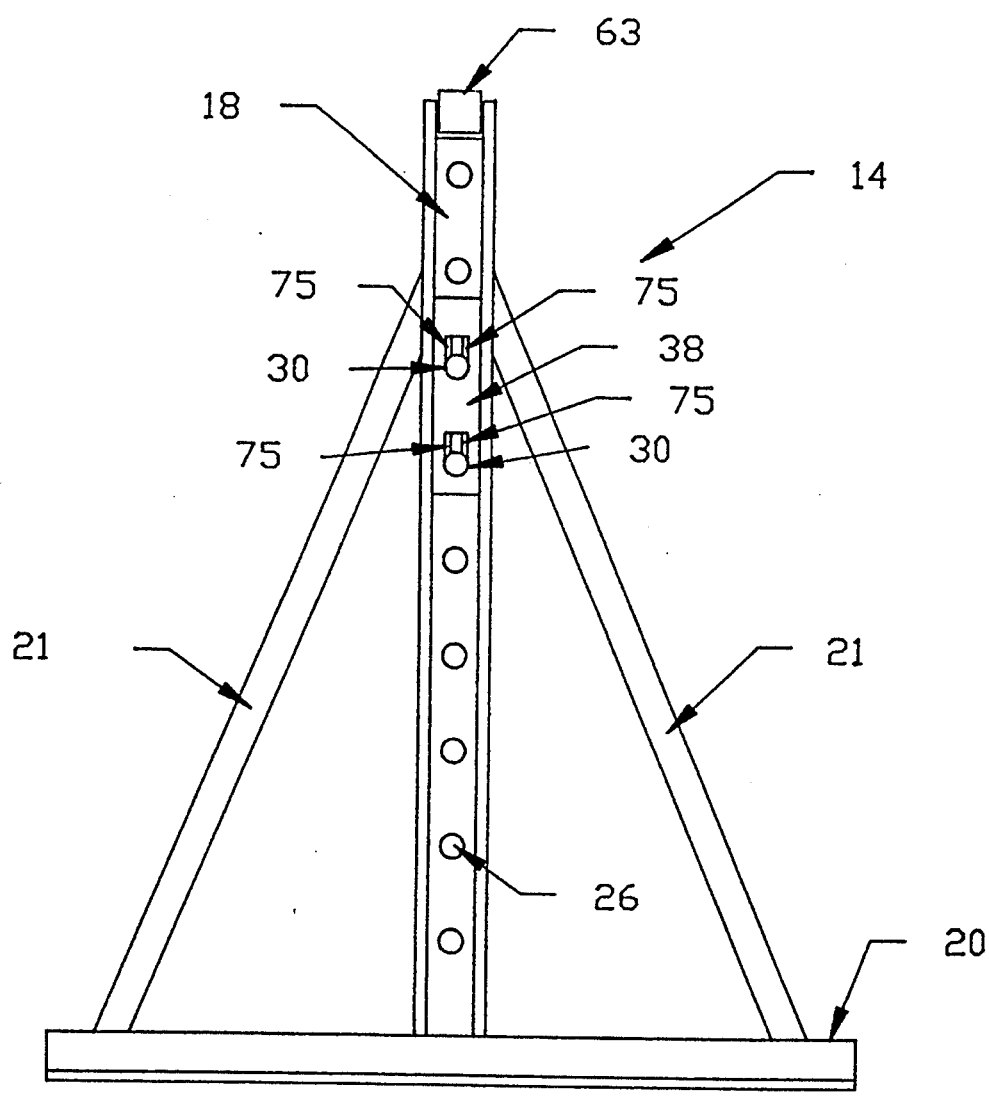
FIG. 3 is a side view of the support bridge of FIG. 1.
Figure 4:
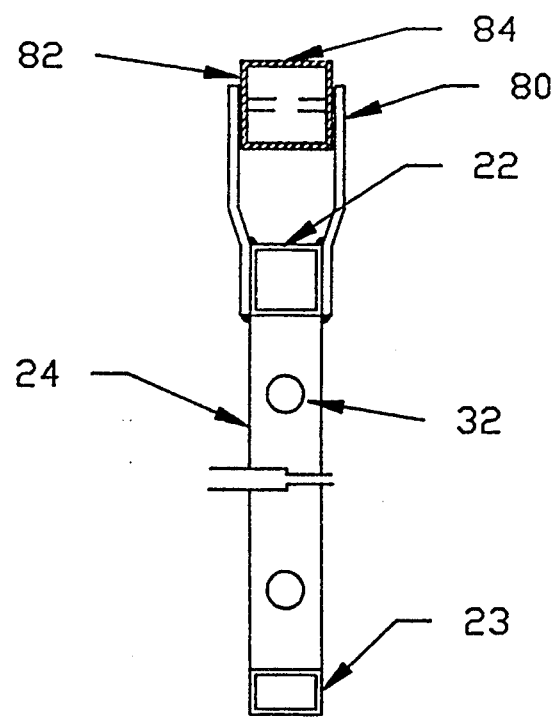
FIG. 4 is a section view taken along line 4—4 of FIG. 1 of locating means for positioning a pipe to supported.

Pipe support bridge 10 comprises a pair of upstanding support brackets 14 and 15 between which a central truss member 16 is supported. As best shown in FIG. 3, each support bracket 14 and 15 comprises a central vertically aligned channel member 18 mounted on a base member 20 with a pair of bracing members 21 extending between the channel member and the base member on either side. Each support bracket includes pipe protection means 63 mounted atop central vertically aligned channel member 18. The outer edge of the channel member 18 is formed with a guide channel 70 adapted to accept a locking plate of the locking means of the present invention.

Figure 2:
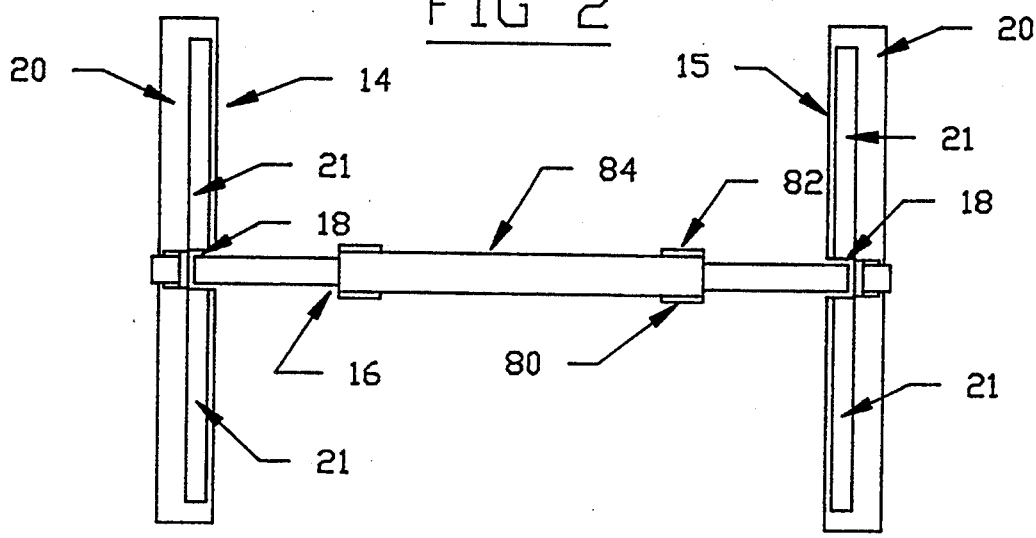
FIG. 2 is a plan view of the support bridge of FIG. 1.

Central truss 16 has a pyramidal shape with a perimeter defined by top and bottom members 22 and 23 respectively, with side members 24 extending therebetween. Top member 22 contacts the pipe 12 to be supported. The interior of central truss 16 has bracing members 25 to carry the compression and tension loads generated by the weight of the pipe. FIG. 2 shows how side edges 24 of central truss 16 are adapted for engagement in channel members 18 of the support brackets. Side members 24 can be slid up and down in channel members 18 to raise and lower the central truss thereby providing a pipe support structure that is easily adjustable to different support heights.

Figure 5:
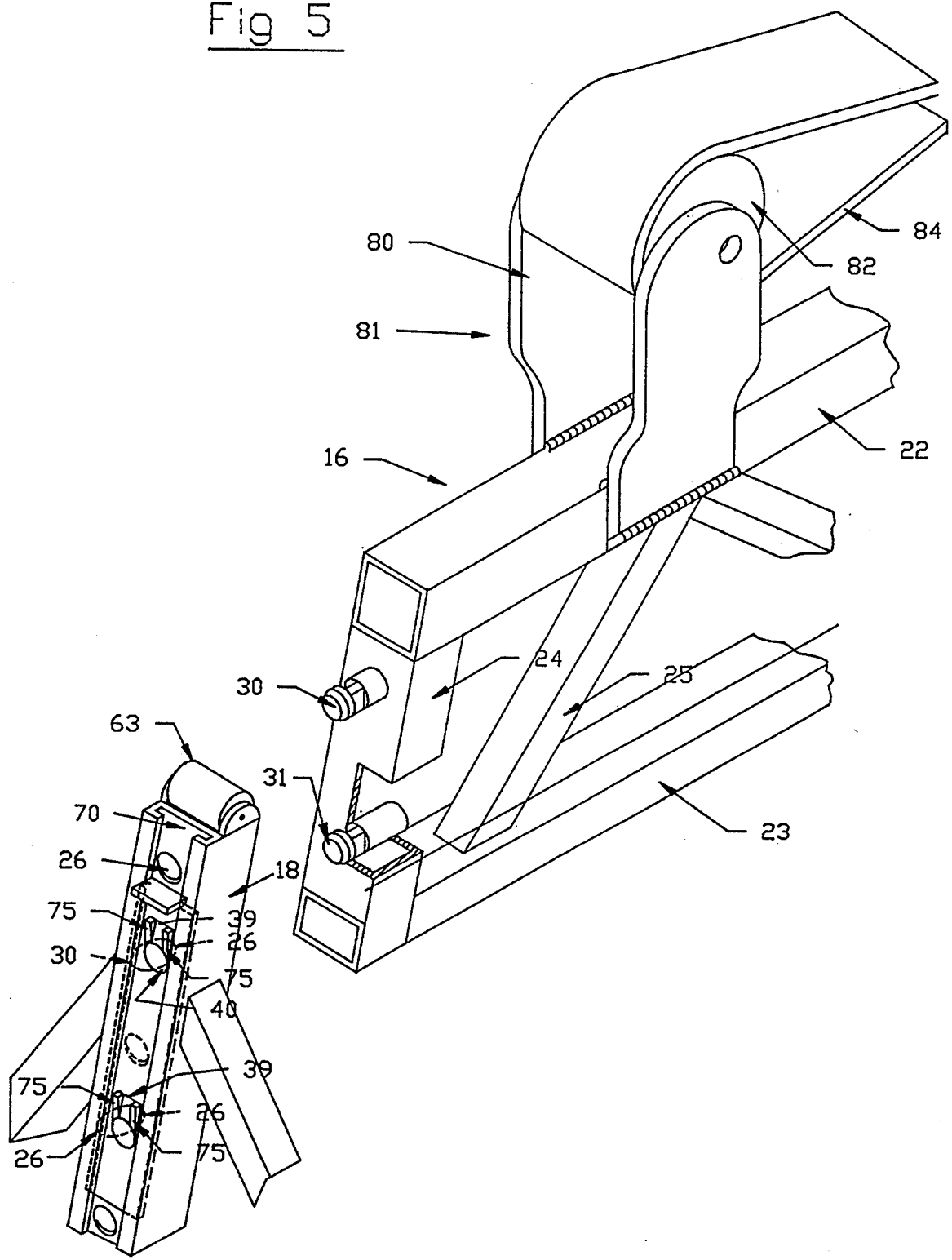
FIG. 5 is an exploded view showing the how the central truss and supports of the present apparatus are assembled in the present invention.

The present invention is also provided with locking means to position central truss 16 at different heights between support brackets 14 and 15. As best shown in FIG. 5, the locking means of the present invention comprise a series of openings 26 extending through channel member 18 adapted to accept pins 30 extending from the side edges 24 of central truss 16. As best shown in FIG. 11, pins 30 are hard steel pins that are fitted into receiving holes 32 formed in the side edges of the central truss 24. As best shown on FIG. 6A each pin has a pair of slots 31 cut in opposite sides of the pin to define a narrowed neck 36 on the pin 30. As shown, it is preferable to have at least two pins extending from side members 24. These pins are insertable through openings 26 extending through channel member 18 to position the central truss member at various heights. In order to properly locate the pin members in a hole, single locking plate 38 is provided that fits over the exposed neck of both pins to lock the central truss and the support brackets together by preventing the pins from slipping out through openings 26.

Locking plates 38 are formed with a longitudinal opening 39 therethrough. End 40 of the opening is enlarged to fit over pin neck 36 and opening 39 is adapted to slide downwardly over the neck of the pin, as shown in FIG. 3, to position the plate between channel member 18 and pin neck 36. Preferably, locking plates 38 are provided with a ramped surface 75 that acts to tightly wedge the locking plate into position between the channel member and the pin neck.

As previously mentioned, top member 22 of central truss member 16 actually has the section of pipe 12 to be supported resting on it. To position the pipe section atop top member 22 pipe locating means 81 are provided comprising a pair of mounting members 80 that are fixed to the top of member 22. Each mounting member 80 includes a suspension member 82 about which a flexible belt 84 is attached such that the belt extends between the two mounting members 80 to allow for suspension of a pipe member being worked on. It is desirable that the flexible belt 84 be made from an insulating material such that the pipeline under construction never makes contact with the steel structure of the pipe bridge thereby insulating the pipeline from electrical contact.

As best shown in FIG. 9, each support bracket comprises a central vertically aligned channel member 18 mounted on a base member 20 with a pair of bracing members 21 extending between the channel member and the base member on either side. The outer edge of the channel member 18 is formed with a guide channel 70 adapted to accept a locking plate of the locking means of the present invention.

The present invention can be interconnected in a variety of ways as shown in FIG. 12 in order to support particularly heavy loads on uneven terrain. In FIG. 12, a pair of pipe support bridges 130 and 131 are joined together by a central truss member 137 that extends between the pipe support bridges 130 and 131. As best shown in FIG. 8, each central truss member is formed with interconnecting means including an interconnecting member 140 centrally located within the bracing system of a first truss and extending between the top and bottom members. The interconnecting member 140 is a channelled member capable of accepting a locking plate 38 having openings 40 designed to accept the pins of a second truss member such that the second truss extends at right angles to the first truss. A locking plate is used to lock the pins in place in an identical manner to the system used to lock a central truss member to the channel member 18 of a support bracket. Obviously, the locking means of the present invention with its system of pins and locking plates allows for a wide variety of interconnections between the component parts of the structure.

A further component for use with the present invention is shown in FIG. 7. The pipe support bridge provides a useful work platform for cutting and preparing pipe section during construction of a pipeline and FIG. 7 shows an attachment useful for supporting a pipe section that allows easy manipulation of the pipe. The attachment comprises a roller 65 mounted to a straddling attachment 66 for placement atop top member 22 shown in dashed lines. Roller 65 supports a pipe section and allows the pipe to be more easily handled and manoeuvred as, for example, when moving the pipe forward to cut off section.

The pipe support bridge of is preferably constructed from conventional square metal tubing or channel iron that is welded together to provide a sturdy but light weight structure. An assembled prototype of the present invention built with 2×2 inch square tubing and 2.25×2.25×0.25 inch channel iron and having a central truss with a length of 48 inches weighed only 55 pounds and was capable of supporting a static design force of 45,000 pounds.

Although the present invention has been described in some detail by way of example for purposes of clarity and understanding, it will be apparent that certain changes and modifications may be practised within the scope of the appended claims.

The invention in which an exclusive property or privilege is claimed are defined as follows:

1. A pipe support bridge comprising:
   a pair of upstanding support brackets, each support bracket having a vertically aligned channel member:
   a central truss member having top and bottom edges and side edges, the top edge is shorter than the bottom edge, each side edge, being slidably received in the central channel member of one of the said bracket such that said central truss member is supported between said supporting brackets such that the assembled pipe support bridge is adjustably angled to a supporting surface;
   locking means to locate said central truss member at different heights in said channel members of said support brackets;
   pipe locating mean fixed to said truss member for positioning a pipe to be supported atop said pipe support bridge.

2. A pipe support bridge as claimed in claim 1 in which said locking means comprises:
- a plurality of spaced openings in said vertically aligned channel members;
- at least two pins extending outwardly from each side edge of said central truss member, said pins having stop means being alignable with and adapted for insertion through selected openings in said channel members such that said stop means are exposed on the opposite side of said channel members; and
- locking plate for fitting over the exposed ends of said pins and engaging said stop means to lock said central truss and said support bracket together by preventing said pins for exiting through said opening.

3. A pipe support bridge as claimed in claim 2 in which said stop means of said pin comprises a pair of slots cut in opposite sides of the pin to define a narrowed neck.

4. A pipe support bridge as claimed in claim 2 in which said stop means comprises a pair of slots cut in opposite sides of said pin to define a neck on said pin.

5. A pipe support bridge as claimed in claim 4 in which said slots narrows downwardly.

6. A pipe support bridge as claimed in claim 2 in which said locking plate is formed with at least one channel therethrough dimensioned to allow for slidable movement of said locking plate perpendicular to the longitudinal axis of said pin, said stop means of said pin preventing movement of said lock plate axially of said pin, said channel having an enlarged end portion adapted to fit over said stop means to allow said locking plate to be fitted over said pin.

7. A pipe support bridge as claimed in claim 6 in which said locking plate includes wedging means to tightly position said locking plate between said stop means and said channel member of said support bracket.

8. A pipe support bridge as claimed in claim 7 in which said wedging means comprises ramped surfaces adjacent the edges of said channel of said locking plate.

9. A pipe support bridge as claimed in claim 2 in which said vertically aligned channel member is formed with a guide channel to accept said locking plate.

10. a pipe support bridge as claimed in claim 1 in which said means to engage a portion of the periphery of the pipe comprises:
- flexible belts extending between said fixed pipe locating means to support the lower periphery of the pipe.

11. A pipe support bridge as claimed in claim 1 in which said central truss member has interconnecting means for perpendicular connection of a first central truss member to a second central truss members comprising:
- an interconnecting member extending between the top and bottom edges of said first central truss member with a plurality of spaced openings in said interconnecting member;
- at least two pins extending outwardly from a side edge of said second central truss member, said pins having stop means and being alignable with and adapted for insertion through selected openings in said interconnecting member such that said stop means are exposed on the opposite side of said interconnecting member; and
- a locking plate for fitting over the exposed ends of said pins and engaging said stop means to lock said first central truss member and said second central truss member together at right angles by preventing said pins from exiting through said opening.

* * * * *